Dec. 30, 1969　　　A. I. NEGUS, JR　　　3,486,680
ANIMAL SHIPPING BOX
Filed April 18, 1968　　　3 Sheets-Sheet 1
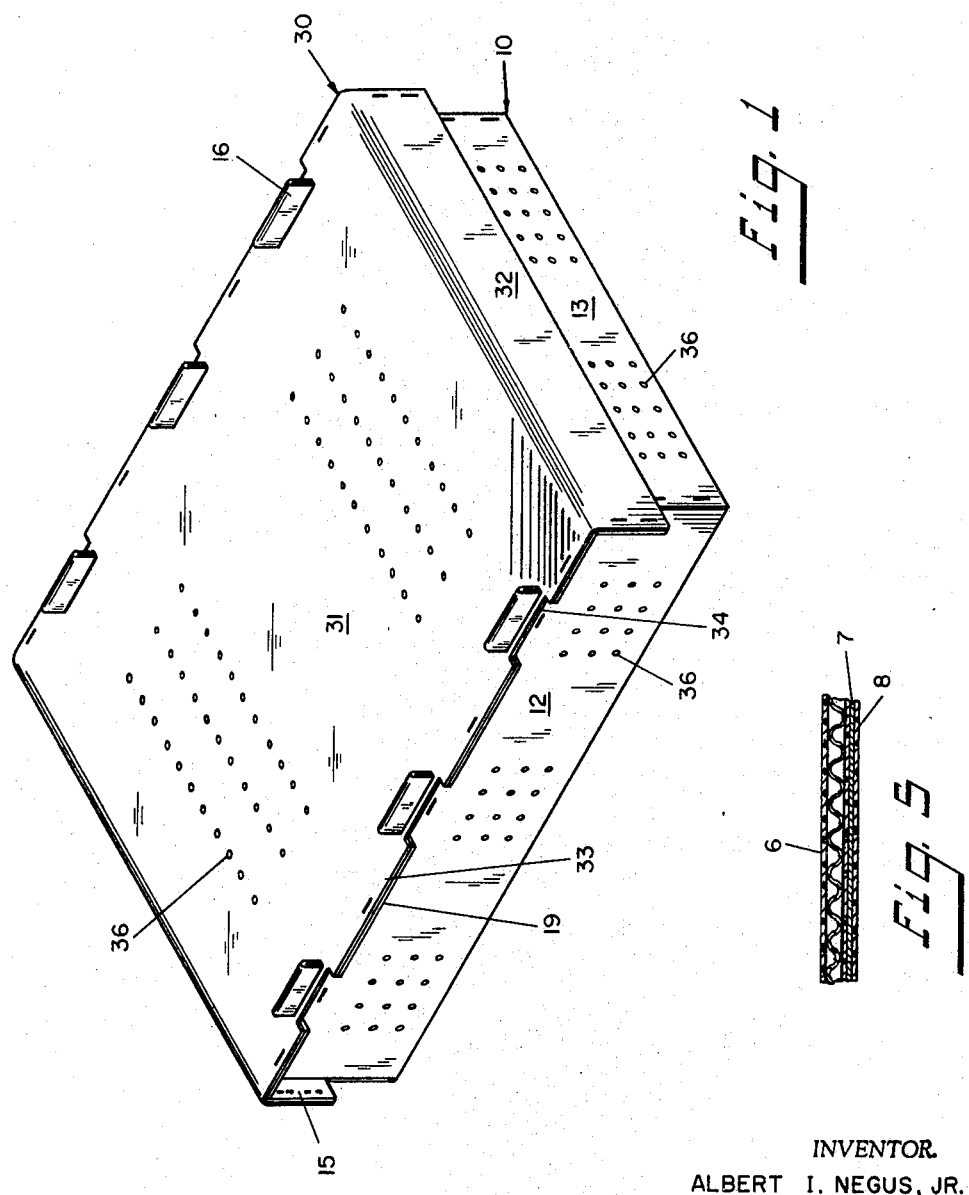
INVENTOR.
ALBERT I. NEGUS, JR.
BY
ATTORNEYS Dec. 30, 1969          A. I. NEGUS, JR          3,486,680
                      ANIMAL SHIPPING BOX
Filed April 18, 1968                          3 Sheets-Sheet 2
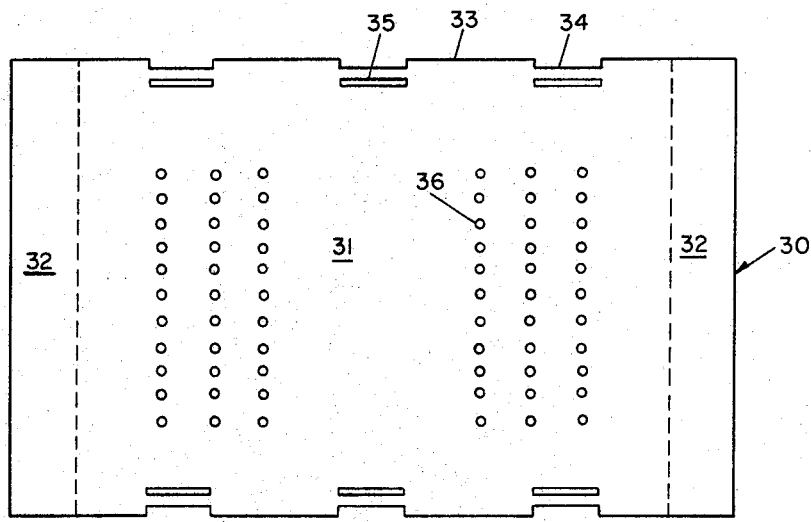
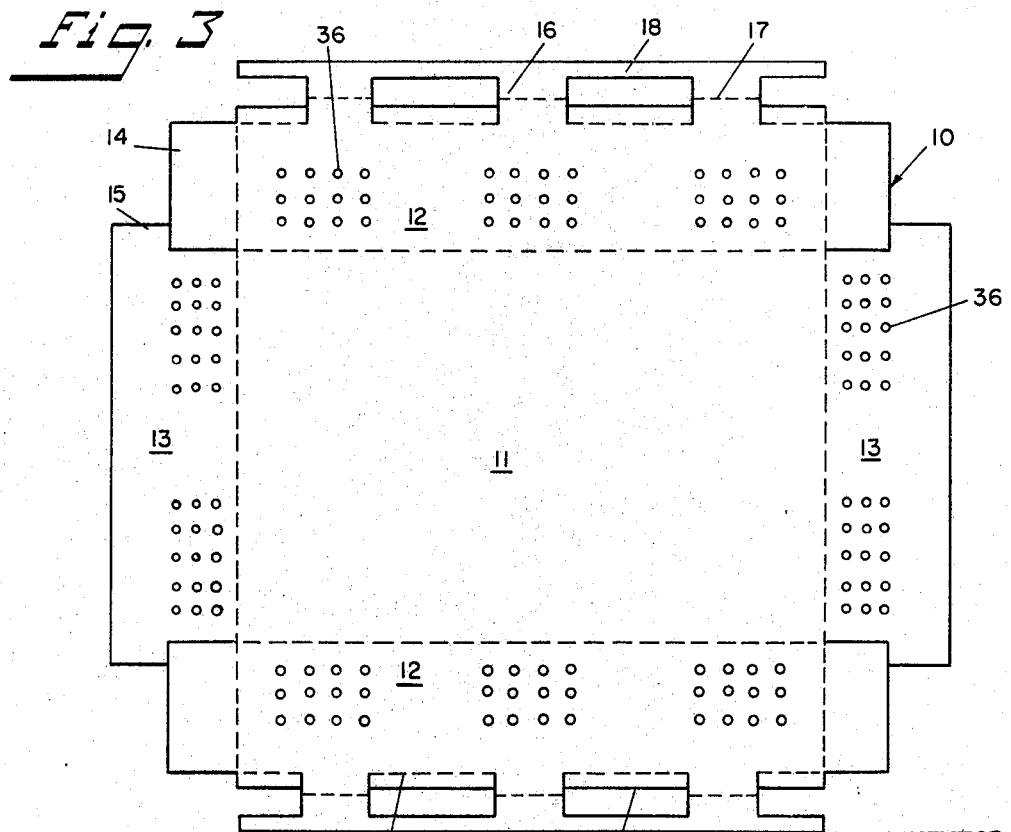
INVENTOR.
ALBERT I. NEGUS, JR.
BY Joseph G. Werner
John M. Winter
ATTORNEYS

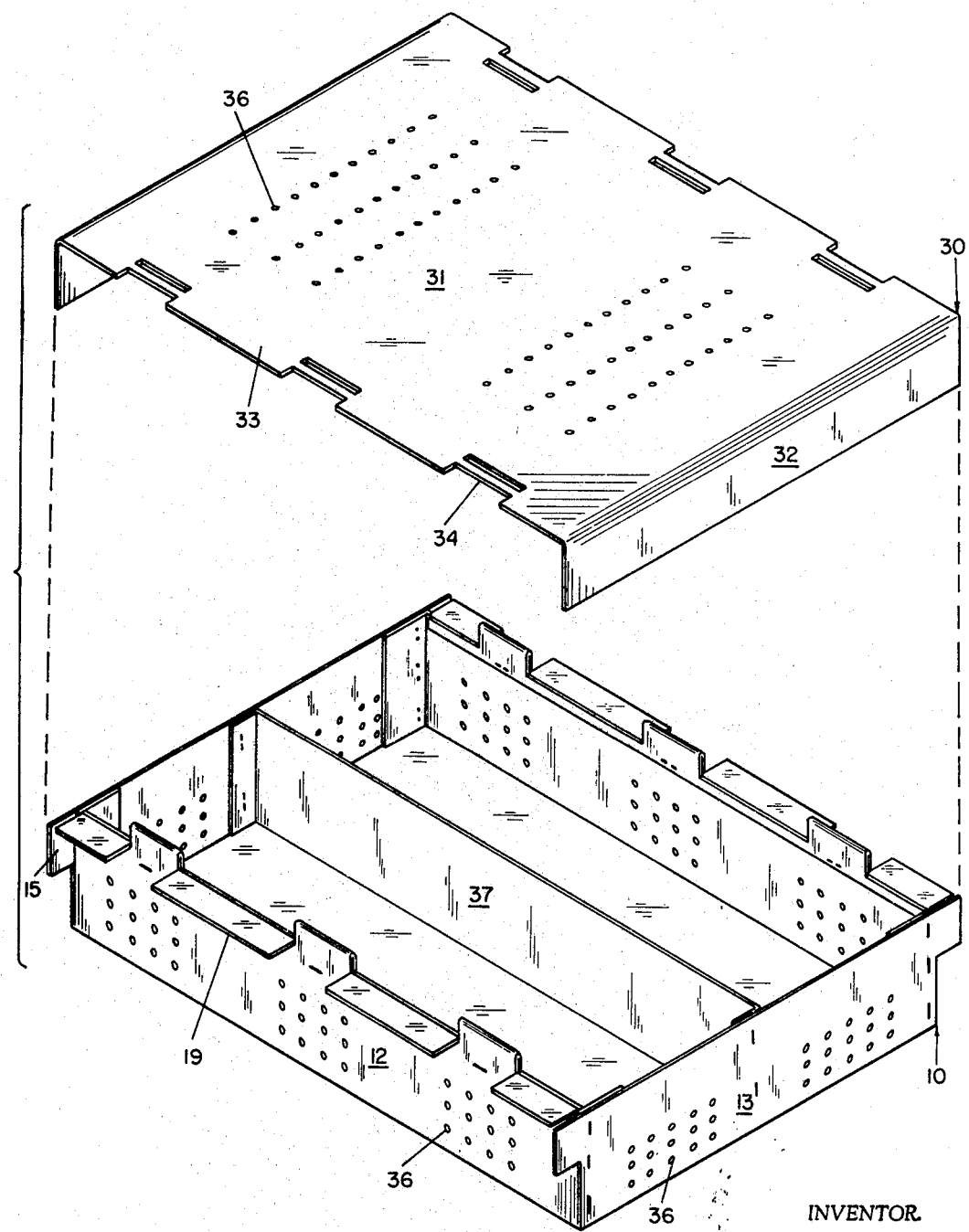

United States Patent Office
3,486,680
Patented Dec. 30, 1969

3,486,680
ANIMAL SHIPPING BOX
Albert I. Negus, Jr., 2719 Van Hise Ave.,
Madison, Wis. 53705
Filed Apr. 18, 1968, Ser. No. 722,245
Int. Cl. B65d 85/50
U.S. Cl. 229—32    3 Claims

ABSTRACT OF THE DISCLOSURE

A shipping box for small live animals which is made of two blanks of laminated material comprising corrugated paperboard, thin sheet metal, and thin paperboard. The box has an imperforate rectangular bottom and perforated vertical rectangular sides and ends integral with the bottom and folded upwardly therefrom. A perforated cover which extends beyond the sides of the box is folded down over the ends of the box and stapled to extensions thereof. The sides have spacers protruding upwardly through slots in the cover and the cover has cutout portions in the edges thereof for circulation of air between boxes.

BACKGROUND OF THE INVENTION

Field of the invention

This invention relates to shipping boxes for small live animals such as rats and mice used in research, birds, and the like.

Description of the prior art

For years shipping boxes for small animals such as rats, mice, birds and the like have been made of wood or paperboard with screened windows for ventilation. The boxes have proved to be rather unsatisfactory in that they do not provide an adequate chew-proof barrier.

More recently, a shipping box has been designed of corrugated paperboard with tin-coated steel foil laminated on its inner surface. Two trapezoidal shaped sides of the box are made of wire screen mesh to provide ventilation. See U.S. Patent No. 3,306,258. This type of box provides a better chew-proof barrier than the earlier forms of boxes, however, it requires four separate pieces, corrugated paperboard blanks and two formed screened sections having a peripheral flange for attachment to the corrugated paperboard pieces.

SUMMARY OF THE INVENTION

Briefly, my invention comprises a shipping box for small research animals, birds, and the like which is constructed from two flat blanks of material. The blanks are made of corrugated paperboard, sheet steel, and paperboard laminated together and perforated to provide ventilation holes. The box provides a completely metal-lined enclosure forming an excellent chew-proof barrier.

The boxes are of very simple construction and can be shipped from the manufacturer as flat blanks. The two piece construction permits quick and easy assembly by the animal supplier who need merely fold the box along its score lines and staple it together.

Spacers extending upwardly from the sides through the cover and cutout portion in the edges of the top blank permit circulation of air between boxes and provide adequate ventilation through the perforated cover and sides when the boxes are stacked and closely packed during shipment of the animals.

Because of the very simple and inexpensive construction and the ease and quickness with which the boxes can be set up it is normally less expensive to discard the boxes after the animals have reached their destinations than to return the boxes to the animal supplier for reuse.

Other objects, features and advantages of my invention will be apparent from the following detailed description taken in conjunction with the accompanying drawings wherein in a preferred embodiment of my invention has been selected for exemplification.

BRIEF DESCRIPTION OF THE DRAWINGS

FIGURE 1 is a perspective view of a completed box ready for shipment.
FIGURE 2 is a plan view of the bottom blank from which the box is constructed.
FIGURE 3 is a plan view of the top blank from which the cover is constructed.
FIGURE 4 is an exploded perspective view of the assembled bottom blank of the box with the top being placed thereon.
FIGURE 5 is a magnified cross-section of the laminated material from which the blanks are made.

DESCRIPTION OF THE PREFERRED EMBODIMENT

Referring now more particularly to the drawings wherein like numerals refer to like parts throughout the several views, FIGURE 1 shows my new shipping box construction in its completed form ready for shipment. The box as shown in FIGURE 1 is constructed from the flat blanks 10 and 20 seen in FIGURES 2 and 3 which are assembled in the manner shown in FIGURE 4. As shown in cross-section in FIGURE 5, the blanks 10 and 30 are made of laminated sheets comprising corrugated paperboard 6 with a very thin sheet steel 7 adhered to the inside surface of the corrugated paperboard. A thin sheet of paperboard 8 is adhered to the sheet steel 7 to form the inside surface of the box. Sheet 8 provides insulation and a somewhat rougher surface than the sheet steel to prevent the animals from sliding about in the box during shipment.

The bottom blank 10 comprises a flat sheet which is cut and scored for folding and stapling to form a bottom 11 and a pair of sides 12 and ends 13 extending upwardly from the bottom at right angles thereto.

The sides 12 have corner flaps 14 for stapling to the ends 13 as shown in FIGURE 4 to form the receptional portion of the box. The ends 13 have extensions 15 formed at the upper corners thereof and which extend beyond the sides of the box for attachment to the top blank 30.

Bottom blank 10 also has a plurality of spaces 16 formed thereon. The spacers 16 are formed by folding the blank 10 back on itself about scoreline 17 and stapling an elongate connector portion 18 to the sides 12. This provides the double-thickness spacers 17 for supporting boxes or other articles that may be stacked thereon during shipment of the animals. A plurality of attaching flanges 19 are formed alternately with spacers 17 and are folded outwardly along scoreline 20 for attaching the top blank 30 to sides 12.

The top blank 30 is cut and scored to provide a cover 31, a pair of end flaps 32 for attachment to end extensions 15, and a plurality of protruding portions 33 for stapling to the attaching flanges 19 on sides 12. Between the protruding portions 33, cutout portions 34 are provided for assuring circulation down between the boxes and through the sides when similar boxes or other articles are packed next to the boxes in abutting relationship.

Slots 35 are provided in the top blank 30 for receiving the upright spacers 17 as shown in the drawings. The spacers, thus, also function to center and hold the cover 31 on the recepticle portion of the box.

Both blanks 10 and 30 are perforated to provide ventilation holes 36 in the cover 31, sides 12 and ends 13.

One of the primary advantages of my invention over known animal shipping box constructions is that I provide a simple and inexpensive two-piece box construction that facilitates quicker and easier assembly of the fewer parts by the animal supplier, thus, cutting his assembly labor costs substantially.

Furthermore, the animals are completely enclosed in steel to prevent them from chewing out while insuring adequate ventilation for the animals even in closely packed conditions during shipping.

As shown in FIGURE 4, is desired, the box may be partitioned by stapling an intermediate wall 37 in the box.

It is understood that my invention is not confined to the particular construction or arrangement of parts herein illustrated and described, but embraces all such modified forms thereof.

I claim:
1. A shipping box for small animals comprising:
 (a) a first perforated blank forming a receptacle portion having a bottom, a pair of sides folded up at right angles to the bottom and a pair of ends folded up at right angles to said bottom,
 (b) a second perforated blank forming a cover for said box, said cover having edges extending outwardly beyond the sides of said box,
 (c) said blank being made of laminated sheets comprising sheet metal adhered between corrugated paperboard on one side and paperboard on the other,
 (d) extensions on each of the ends of said box extending outwardly beyond the sides of said box,
 (e) a pair of end flaps on said cover which are folded down at substantially right angles to the cover and overlap the extensions on said ends for attachment thereto outwardly of the sides of said box, and
 (f) attaching flanges folded outwardly from the tops of the sides of said box for attaching the edges of said cover to said receptacle portion outwardly of the sides of said box.

2. The shipping box for small animals as specified in claim 1 including a plurality of slots formed in the cover of said box and a plurality of spacers extending upwardly from each of the sides of said box through the slots in said cover.

3. The shipping box for small animals as specified in claim 2 wherein said spacers comprise a double layer of said laminated sheets formed by folding a portion of said first blank back on itself in overlapping relation.

References Cited

UNITED STATES PATENTS

| | | | |
|---|---|---|---|
| 2,170,714 | 8/1939 | Ferguson | 229—6 |
| 2,298,146 | 10/1942 | Mersbach | 229—32 |
| 2,333,244 | 11/1943 | Gordon | 229—6 |
| 2,488,121 | 11/1949 | Greve | 229—33 |
| 2,721,687 | 10/1955 | Gross | 229—6 |
| 3,055,573 | 9/1962 | Carter. | |
| 3,079,058 | 2/1963 | Russell | 229—6 |
| 3,306,258 | 2/1967 | Hunt | 119—19 |

DAVIS T. MOORHEAD, Primary Examiner

U.S. Cl. X.R.

229—3.5, 6